Nov. 14, 1967

T. KREY 3,352,375

METHOD AND ARRANGEMENT FOR DETECTING FAULTS
TRAVERSING A MINERAL STRATUM

Filed March 4, 1963

INVENTOR.
Theodor Krey

BY Michael S. Striker
ATTORNEY

United States Patent Office 3,352,375
Patented Nov. 14, 1967

3,352,375
METHOD AND ARRANGEMENT FOR DETECTING FAULTS TRAVERSING A MINERAL STRATUM
Theodor Krey, Hannover, Germany, assignor to Seismos G.m.b.H., Hannover, Germany
Filed Mar. 4, 1963, Ser. No. 262,610
Claims priority, application Germany, Mar. 7, 1962, S 78,369; Sept. 8, 1962, S 81,370
8 Claims. (Cl. 181—.5)

The present invention concerns a method and arrangement for detecting faults and similar disturbances in stratiform mineral beds and strata of small thickness, particularly of coal seams, by seismic exploration below ground. More particularly the invention is concerned with the detection of reflections of seismic waves caused by such disturbances and with the application of this system in coal mining operations.

It is well known to carry out seismic explorations below ground by means of body waves. However, it has been found that this known system is not well suited for detecting directly fault planes comprising only a small slip in coal mines because in most cases an existing fault plane does not possess sufficient contrast characteristics concerning density or specific wave propagation velocity.

It is therefore one object of this invention to to provide for a method and arrangement which is substantially more efficient than the conventional method for detecting faults under the conditions mentioned above and which particularly are well suited for being used in the coal mining industry.

It has been found that highly satisfactory results can be obtained if the system is based not on the observation of body waves but on the observation of reflections of boundary waves travelling along the stratum or coal seam. The density and elasticity of the material constituting the seam usually differ very substantially from the density and elasticity of the adjacent rock whereby the development and propagation of boundary waves travelling along the seam is greatly favored. Boundary waves which are similar to surface waves well known to those skilled in seismology are reflected at fault planes transversing the seam provided that the slip amounts to the entire thickness of the seam or at least to a substantial portion thereof. By applying conventional seismographic methods to the observation of boundary waves and their reflections below ground, taking into account the time factor involved, it is possible to detect the existence of a fault by observation from a point in a working area below ground well ahead of the time when the working of the seam would reach the location of a fault.

In view of the above the invention includes the method of detecting faults traversing a mineral stratum of small thickness, particularly a coal seam, by seismic exploration below ground, comprising the steps of: generating at a selected point of the stratum a vibration for generating waves including boundary waves traveling along said stratum in at least one direction and returning along said stratum in opposite direction as reflected boundary waves when a fault exists which traverses said stratum and causes such reflection; and seismographically recording exclusively said boundary waves, the occurence in said recording of a reflected boundary wave indicating the existence of a fault traversing said stratum.

The invention further includes an arrangement for detecting faults traversing a mineral stratum, particularly a coal seam, of small thickness, by seismic exploration under ground, comprising, in combination, a source of vibration energy located at a selected point of the stratum for generating waves including boundary waves traveling along said stratum in at least one direction and returning along said stratum in opposite direction as reflected boundary waves when a fault exists which traverses said stratum and causes such reflection; geophone means arranged along said stratum for picking up exclusively said boundary waves and furnishing electrical signals representing said boundary waves and reflected boundary waves, if any; and seismograph means connected with said geophone means for recording said electrical signals, the recording of signals representing reflected boundary waves indicating the existence of a fault traversing said stratum and causing said reflection.

It is to be understood, however, that the basic method and arrangement according to the invention must be modified depending upon whether the boundary waves are produced in such a manner that they are symmetrical relative to the center plane of the seam, or whether they are asymmetrical relative to the center plane of the seam. In the case of symmetrical boundary waves the motion components perpendicular to the general plane of the seam and appearing at the upper and lower boundary thereof are directed opposite to each other at a given moment while the motion components which are parallel with the general plane of the seam have the same direction at a given moment at the upper and lower boundary of the seam. In contrast therewith, in the case of asymmetrical boundary waves the motion components perpendicular to the general plane of the seam and appearing at the upper and lower boundaries thereof have the same directions at a given moment while the motion components in direction parallel with the general plane of the seam and appearing simultaneously at the upper and lower boundary thereof are directed opposite to each other.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIG. 1 is a diagrammatic vertical section through a coal mining area and illustrates a method and arrangement according to the invention based on the use of symmetrical boundary waves;

Figure 2:
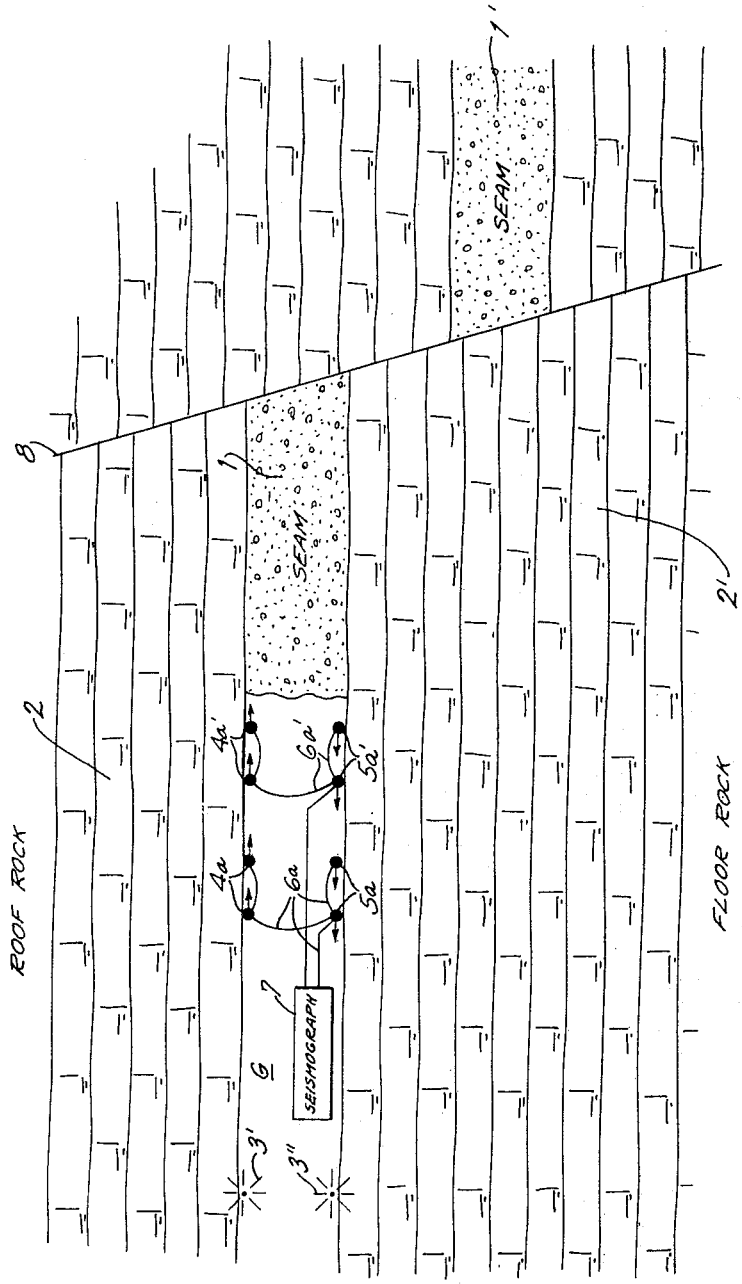
FIG. 2 is a similar diagrammatic section illustrating the method and arrangement according to the invention based on the use of asymmetrical boundary waves.

FIG. 1 illustrates a preferred embodiment of the invention based on the use of symmetrical boundary waves. It is to be borne in mind that symmetrical boundary waves comprise at a given point strong motion components directed perpendicularly relative to the general plane of the seam and symmetrically relative to the center plane of the seam. In order to produce in an efficient manner symmetrical boundary waves in the seam 1 the source of vibration energy 3 should be located substantially in the center plane of the seam 1 i.e. at a suitable point at the side wall of the gallery G. At this point the necessary vibration may be produced simply by a hammer blow, by a small explosion produced in the side wall or by means of a conventional vibrator attached to or held against the wall. At least one geophone 4, preferably a pair thereof, is mounted near the boundary between the seam 1 and the roof rock 2 and similarly at least one geophone 5, preferably a pair thereof, is mounted near the boundary between the seam 1 and the floor rock rock 2' vertically opposite to the geophone or geophone pair 4. It is advisable to mount these geophones on the same wall to which vibration is applied by the source of vibration energy 3. By connection 6 the geophones 4 and 5 are connected in conventional manner with a seismograph 7.

Geophones are well known to the art. It is preferred to use that type of geophones which have a distinct directional axis of sensitivity for electrodynamically transducing the movements of the adjoining material into electrical signals which represent the waves picked up by the geophone so that the signals will produce in the seismograph 7 recordings representing such waves. In view of the above-mentioned characteristic direction of motion components of symmetrical boundary waves the directional axis of the geophone or geophones 4 is directed upwardly, and the directional axis of the geophone or geophones 5 is directed downwardly. Due to this orientation of the geophones the reception of other waves is eliminated. In particular the longitudinal and transversal wave components of body waves are eliminated because in these waves the motion components at the upper and lower edges of the seam have the same direction and amplitude. This applies also to body waves reflected at parallel strata, at least as long as the wave length is large relative to the thickness of the seam, a condition which normally exists. Incidentally, the same discriminating effect which is derived from arranging the geophones 4 and 5 with directional axes opposite to each other can be obtained by connecting these geophones with each other with opposite polarity.

By using pairs of geophones 4 and 5, and if desired additional groups of pairs 4', 5' of geophones connected by connection 6' with the same seismograph 7 the intensity of the electrical signals delivered by the individual geophones is increased by superposition of voltages.

FIG. 1 also illustrates that the gallery G has been driven into the coal seam 1 only to a point beyond the geophones 4' and 5'. A fault 8 is shown traversing the seam 1 which continues at 1' beyond the fault 8. As can be seen the slip is greater than the thickness of the seam 1.

If now with the above described installation in place a vibration is produced at the point 3 substantially in the center plane of the seam 1, waves are generated which include symmetrical boundary waves traveling mainly along the upper and lower boundaries of the seam 1. The vertical components of these boundary waves are picked up by the geophones 4, 5, 4', 5', etc., horizontal components thereof and the vertical components of body waves and reflected body waves being excluded by the orientation of the geophones. If a fault 8 exists the boundary waves traveling along the seam 1 are clearly reflected by the fault plane and return to the geophones 4, 5, 4' and 5' where they are picked up in the same manner as the waves originally generated by the source 3 and are likewise recorded by the seismograph 7. As is well known the recordings of direct waves and reflected waves differ significantly on a seismogram so that the existence of a fault 8 will be established by conventional interpretation of the seismogram.

Figure 4:
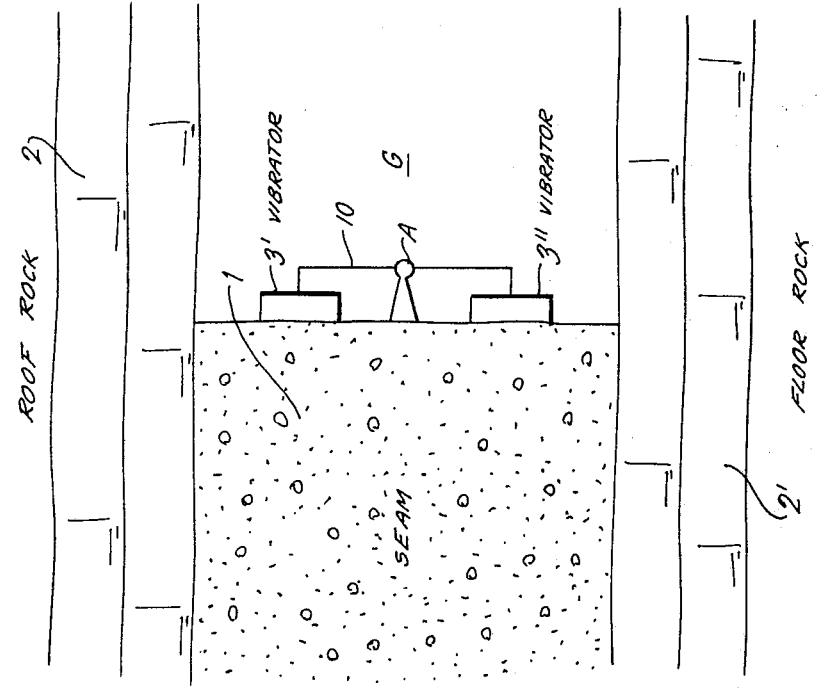
FIG. 4 is a similar sectional view as FIG. 3 illustrating a modification of the arrangement according to FIG. 3.
Figure 3:
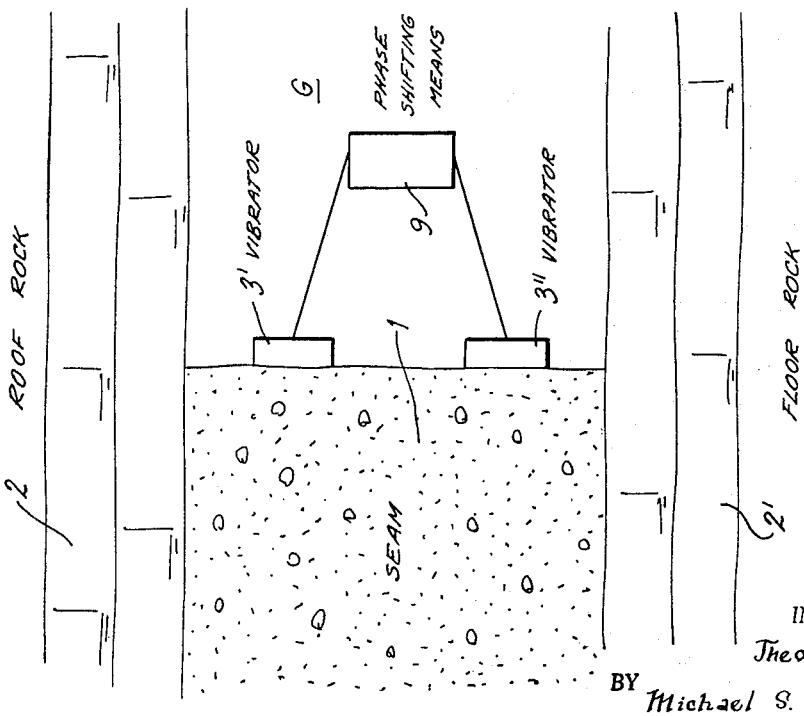
FIG. 3 is a diagrammatic section taken at right angles to the plane of FIG. 2 and illustrates certain details of the arrangement of FIG. 2.

FIGS. 2–4 apply to that modification of the invention in which asymmetrical boundary waves are employed. As can be seen generally the arrangement are the same as in FIG. 1. However, in this case the source of vibration 3' is arranged near the upper boundary between the seam 1 and the roof rock 2 because in this manner the development of asymmetrical boundary waves is favored. It is even more advantageous to use in this case two sources of vibration 3' and 3'', one located near the upper boundary and one located near the lower boundary between the seam 1 and the adjoining rock, as shown in FIG. 2. In view of the fact mentioned above that the horizontal motion components of asymmetrical boundary waves are directed in one direction at the upper boundary of the seam and in opposite direction at the lower boundary of the seam, the geophones or geophone groups 4a, 5a, 4a' and 5a' are oriented with their directional axes in directions substantially parallel with the general plane of the seam 1, but the upper geophones 4a and 4a' in a direction opposite to that of the lower geophones 5a and 5a'. The geophone groups are connected by lines 6a and 6a' again with a seismograph 7.

It must not be overlooked that in view of the asymmetrical relation between the boundary waves traveling along the upper boundary and the boundary waves traveling along the lower boundary of the seam vibrators used as sources of vibration and energy 3' and 3'' must operate in such a manner that the vibrations produced by the two vibrators are 180° offset against each other in phase. This is diagrammatically illustrated by FIGS. 3 and 4. In the case of FIG. 3 the conventional electrical vibrators 3' and 3'' are interconnected by conventional phase shifting means 9 whereby the desired phase relationship between the two vibrators is easily established. In the case of FIG. 4 two vibrator devices 3' and 3'' are mechanically coupled with each other as indicated at 10, the mechanical connection 10 being pivotally supported at a stationary pivot point A so that in this manner the desired phase relationship between the action of the two vibrators is established mechanically.

As in the first described example, instead of orienting the directional axes of the upper geophones in a direction opposite to that of the lower geophones, the same effect can be obtained if all the geophones are oriented in the same direction parallel with the general plane of the seam 1, provided that the upper geophones are connected with the lower geophones with opposite polarity.

Also in this embodiment of the invention it is advisable to use a plurality of geophones along the upper boundary and a plurality of geophones along the lower boundary in positions vertically opposite each other, respectively, as shown, because the effect of the geophones is increased thereby.

It should be noted that in the case of asymmetrical boundary waves the horizontal motion component of these waves is particularly strong at or near the upper and lower boundary of the seam. In the case of the well known generalized Love-waves only this horizontal motion component exists.

If a now a vibration is produced by at least one source of vibration energy 3', or preferably by two such sources 3' and 3'' located as illustrated, waves are generated which include asymmetrical boundary waves traveling along the boundaries between the roof rock 2 and the floor rock 2', respectively. The horizontal components of these waves are recorded by the seismograph 7 because they are picked up by the geophones 4a, 5a, 4a', 5a', etc. as mentioned above. If a fault 8 exists as illustrated the traveling boundary waves will be reflected by the fault plane and return to be picked up in the same manner by the geophones 4a, 5a, 4a', 5a', etc. and to be also recorded by the seismograph 7. The result is the same as described above. However, longitudinal and transversal body waves are not picked up by the geophones and therefore not recorded because the components of these waves have a directional characteristic which prevents them from being picked up by the geophones on account of their directional characteristic or connection with opposite polarity.

While the above description of examples refers mainly to conditions existing in coal mining it should be understood that the system according to the invention applies to all cases where a stratum or bed of comparatively small thickness is embedded between a more or less homogenous rock, the density and elasticity of the material of the stratum or the bed differing substantially from the density and elasticity of the adjoining rock.

It will be understood that each of the elements described above or two or more together, may also find a useful application in other types of a method and arrangement for detecting faults of a mineral stratum differing from the types described above.

While the invention has been illustrated and described as embodied in a method and arrangement for detecting faults of a mineral stratum of small thickness by seismic exploration below ground, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptation should and are intended to be comprehended within the meaning and range of equivalence of the following claims.

What is claimed and desired to be secured by Letters Patent is:

1. The method of detecting faults traversing a mineral stratum of small thickness surrounded by beds of material having a different density and elasticity than that of said mineral stratum of small thickness, particularly a coal seam, by seismic exploration below ground, comprising the steps of: generating at a selected first point near the upper boundary and simultaneously at a second point opposite said first point and near the lower boundary of the stratum and at one side of any existing fault traversing said stratum a vibration for generating waves including asymmetrical boundary waves traveling along said upper and lower boundaries, respectively, of said stratum in at least one direction and returning along said stratum in opposite direction as reflected boundary waves when a fault exists which traverses said stratum and causes such reflection, said boundary waves traveling along said upper boundary being offset 180° in phase relative to said boundary waves traveling along said lower boundary of said stratum; and seismographically recording exclusively said boundary waves at said one side of any existing fault, the occurrence in said recording of a reflected boundary wave indicating the existence of a fault traversing said stratum.

2. An arrangement for detecting faults traversing a mineral stratum, particularly a coal seam, of small thickness surrounded by beds of material having a different density and elasticity than that of said mineral stratum of small thickness, by seismic exploration under ground, comprising, in combination, a source of vibration energy located at a selected point substantially in the center plane of the stratum and at one side of any existing fault traversing said stratum for generating waves including symmetrical boundary waves traveling along said stratum in at least one direction and returning along said stratum in opposite direction as reflected boundary waves when a fault exists which traverses said stratum and causes such reflection; geophone means having a characteristic vector of maximum sensitivity arranged along said stratum in pairs, at least one first geophone means being arranged near the upper boundary of said stratum, and at least one second geophone means being arranged near the lower boundary of said stratum transversely opposite of said first geophone means, both said geophone means being located at said one side of any existing fault and being oriented with their vectors of maximum sensitivity pointing in directions substantially perpendicular to said stratum, but opposite to each other, for picking up exclusively said boundary waves and furnishing electrical signals representing said boundary waves and reflected boundary waves, if any; and seismograph means connected with said geophone means for recording said electrical signals, the recording of signals representing reflected boundary waves indicating the existence of a fault traversing said stratum and causing said reflection.

3. An arrangement for detecting faults traversing a mineral stratum, particularly a coal seam, of small thickness surrounded by beds of material having a different density and elasticity than that of said mineral stratum of small thickness, by seismic exploration under ground, comprising, in combination, a source of vibration energy located at a selected point substantially in the center plane of the stratum and at one side of any existing fault traversing said stratum for generating waves including symmetrical boundary waves traveling along said stratum in at least one direction and returning along said stratum in opposite direction as reflected boundary waves when a fault exists which traverses said stratum and causes such reflection; geophone means having a characteristic vector of maximum sensitivity arranged along said stratum in pairs, at least one first geophone means being arranged near the upper boundary of said stratum, and at least one second geophone means being arranged near the lower boundary of said stratum transversely opposite of said first geophone means, both said geophone means being located at said one side of any existing fault and being oriented with their vectors of maximum sensitivity pointing in directions substantially perpendicular to said stratum, but opposite to each other, for picking up exclusively said boundary waves and furnishing electrical signals representing said boundary waves and reflected boundary waves, if any; and seismograph means connected with said pairs of geophone means for recording said electrical signals, the geophone means of each of said pairs thereof being connected together with identical polarity, the recording of signals representing reflected boundary waves indicating the existence of a fault traversing said stratum and causing said reflection.

4. An arrangement for detecting faults traversing a mineral stratum, particularly a coal seam, of small thickness surrounded by beds of material having a different density and elasticity than that of said mineral stratum of small thickness, by seismic exploration under ground, comprising, in combination, a source of vibration energy located at a selected point substantially in the center plane of the stratum and at one side of any existing fault traversing said stratum for generating waves including symmetrical boundary waves traveling along said stratum in at least one direction and returning along said stratum in opposite direction as reflected boundary waves when a fault exists which traverses said stratum and causes such reflection; geophone means having a characteristic vector of maximum sensitivity arranged along said stratum in pairs, at least one first geophone means being arranged near the upper boundary of said stratum, and at least one second geophone means being arranged near the lower boundary of said stratum transversely opposite of said first geophone means, both said geophone means being located at said one side of any existing fault and being oriented with their vectors of maximum sensitivity pointing in identical directions substantially perpendicular to said stratum, for picking up exclusively said boundary waves and furnishing electrical signals representing said boundary waves and reflected boundary waves, if any; and seismograph means connected with said pairs of geophone means for recording said electrical signals, the geophone means of each of said pairs thereof being connected together with opposite polarity, the recording of signals representing reflected boundary waves indicating the existence of a fault traversing said stratum and causing said reflection.

5. An arrangement for detecting faults traversing a mineral stratum, particularly a coal seam, of small thickness surrounded by beds of material having a different density and elasticity than that of said mineral stratum of small thickness, by seismic exploration under ground, comprising, in combination, a first source of vibration energy located at a first selected point near the upper boundary of the stratum and a second source of vibration energy located at a second point near the lower boundary of said stratum opposite said first point for generating waves including asymmetrical boundary waves traveling along said stratum in at least one direction and returning along said upper and lower boundaries, respectively, of said stratum in opposite direction as reflected boundary waves when a fault exists which traverses said stratum and causes such reflection, said first and said second source of vibration energy being located at one side of any existing fault traversing said stratum, said boundary waves generated by said first source of vibration energy being offset 180° in phase relative to the boundary waves generated by said second source of vibration energy; geophone means arranged along said stratum at said one side of any existing fault for picking up exclusively said boundary waves and furnishing electrical signals representing said boundary waves and reflected boundary waves, if any; and seismograph means connected with said geophone means for recording said electrical signals, the recording of signals representing reflected boundary waves indicating the existence of a fault traversing said stratum and causing said reflection.

6. An arrangement for detecting faults traversing a mineral stratum, particularly a coal seam, of small thickness surrounded by beds of material having a different density and elasticity than that of said mineral stratum of small thickness, by seismic exploration under ground, comprising, in combniation, a first source of vibration energy located at a first selected point near the upper boundary of the stratum and a second source of vibration energy located at a second point near the lower boundary of said stratum opposite said first point for generating waves including asymmetrical boundary waves traveling along said stratum in at least one direction and returning along said upper and lower boundaries, repectively, of said stratum in opposite direction as reflected boundary waves when a fault exists which traverses said stratum and causes such reflection, said first and said second source of vibration energy being located at one side of any existing fault traversing said stratum, said boundary waves generated by said first source of vibration energy being offset 180° in phase relative to the boundary waves generated by said second source of vibration energy; geophone means having a characteristic vector of maximum sensitivity arranged along said stratum in pairs, at least one first geophone means being arranged near the upper boundary of said stratum, and at least one second geophone means being arranged near the lower boundary of said stratum transversely opposite of said first geophone means, both said geophone means being located at said one side of any existing fault and being oriented with their vectors of maximum sensitivity pointing in directions substantially parallel with the general plane of said stratum, but opposite to each other for picking up exclusively said boundary waves and furnishing electrical signals representing said boundary waves and reflected boundary waves, if any; and seismograph means connected with said geophone means for recording said electrical signals, the recording of signals representing reflected boundary waves indicating the existence of a fault traversing said stratum and causing said reflection.

7. An arrangement for detecting faults traversing a mineral stratum, particularly a coal seam, of small thickness surrounded by beds of material having a different density and elasticity than that of said mineral stratum of small thickness, by seismic exploration under ground, comprising, in combination, a first source of vibration energy located at a first selected point near the upper boundary of the stratum and a second source of vibration energy located at a second point near the lower boundary of said stratum opposite said first point for generating waves including asymmetrical boundary waves traveling along said stratum in at least one direction and returning along said upper and lower boundaries, respectively, of said stratum in opposite direction as reflected boundary waves when a fault exists which traverses said stratum and causes such reflection, said first and said second source of vibration energy being located at one side of any existing fault traversing said stratum, said boundary waves generated by said first source of vibration energy being offset 180° in phase relative to the boundary waves generated by said second source of vibration energy; geophone means having a characteristic vector of maximum sensitivity arranged along said stratum in pairs, at least one first geophone means being arranged near the upper boundary of said stratum, and at least one second geophone means being arranged near the lower boundary of said stratum transversely opposite of said first geophone means, both said geophone means being located at said one side of any existing fault and being oriented with their vectors of maximum sensitivity pointing in directions substantially parallel with the general plane of said stratum, but opposite to each other for picking up exclusively said boundary waves and furnishing electrical signals representing said boundary waves and reflected boundary waves, if any; and seismograph means connected with said pairs of geophone means for recording said electrical signals, the geophone means of each of said pairs thereof being connected together with identical polarity, the recording of signals representing reflected boundary waves indicating the existence of a fault traversing said stratum and causing said reflection.

8. An arrangement for detecting faults traversing a mineral stratum, particularly a coal seam, of small thickness surrounded by beds of material having a different density and elasticity than that of said mineral stratum of small thickness, by seismic exploration under ground, comprising, in combination, a first source of vibration energy located at a first selected point near the upper boundary of the stratum and a second source of vibration energy located at a second point near the lower boundary of said stratum opposite said first point for generating waves including asymmetrical boundary waves traveling along said stratum in at least one direction and returning along said upper and lower boundaries, respectively, of said stratum in opposite direction as reflected boundary waves when a fault exists which traverses said stratum and causes such reflection, said first and said second source of vibration energy being located at one side of any existing fault traversing said stratum, said boundary waves generated by said first source of vibration energy being offset 180° in phase relative to the boundary waves generated by said second source of vibration energy; geophone means having a characteristic vector of maximum sensitivity arranged arranged along said stratum in pairs, at least one first geophone means being arranged near the upper boundary of said stratum, and at least one second geophone means being arranged near the lower boundary of said stratum transversely opposite of said first geophone means, both said geophone means being located at said one side of any existing fault and being oriented with their vectors of maximum sensitivity pointing in identical directions substantially parallel with the general plane of said stratum, for picking up exclusively said boundary waves and furnishing electrical signals representing said boundary waves and reflected boundary waves, if any; and seismograph means connected with said pairs of geophone means for recording said electrical signals, the geophone means of each of said pairs thereof being connected together with opposite polarity, the recording of signals representing reflected boundary waves indicating the existence of a fault traversing said stratum and causing said reflection.

References Cited

UNITED STATES PATENTS

| | | | |
|---|---|---|---|
| 1,724,495 | 8/1929 | McCollum | 181—.5 |
| 1,909,205 | 5/1933 | McCollum | 181—.5 |
| 1,923,107 | 8/1933 | McCollum | 181—.5 |
| 2,001,429 | 5/1935 | McCollum et al. | 181—.5 |
| 2,021,943 | 11/1935 | McCollum | 181—.5 |
| 2,153,920 | 4/1939 | Gardner | 181—.5 |
| 2,268,130 | 12/1941 | Slotnick | 181—.5 |
| 2,718,929 | 9/1955 | Weiss | 181—.5 |
| 3,193,004 | 7/1965 | Albright et al. | 166—4 |

SAMUEL W. ENGLE, *Primary Examiner.*

BENJAMIN A. BORCHELT, *Examiner.*

R. M. SKOLNIK, P. A. SHANLEY,
*Assistant Examiners.*